United States Patent
Davey

(10) Patent No.: US 10,190,692 B2
(45) Date of Patent: Jan. 29, 2019

(54) FLEXIBLE METAL SEAL ASSEMBLY

(71) Applicant: Senior IP GmbH, Schaffhausen (CH)

(72) Inventor: Mark Davey, North Aurora, IL (US)

(73) Assignee: SENIOR IP GmbH, Schauffhausen (CH)

( * ) Notice: Subject to any disclaimer, the term of this patent is extended or adjusted under 35 U.S.C. 154(b) by 0 days.

(21) Appl. No.: 15/394,175

(22) Filed: Dec. 29, 2016

(65) Prior Publication Data
US 2018/0187786 A1 Jul. 5, 2018

(51) Int. Cl.
| | | |
|---|---|---|
| F16J 15/52 | (2006.01) | |
| F16J 15/36 | (2006.01) | |
| F16K 1/32 | (2006.01) | |
| F16J 3/04 | (2006.01) | |
| F16L 51/03 | (2006.01) | |
| F02M 59/10 | (2006.01) | |
| F02M 59/44 | (2006.01) | |
| F02M 55/00 | (2006.01) | |

(52) U.S. Cl.
CPC .............. *F16J 15/363* (2013.01); *F16J 3/047* (2013.01); *F16J 15/52* (2013.01); *F16K 1/32* (2013.01); *F16L 51/035* (2013.01); *F02M 55/004* (2013.01); *F02M 59/102* (2013.01); *F02M 59/442* (2013.01); *F02M 2200/16* (2013.01)

(58) Field of Classification Search
CPC ........... F16J 15/36; F16J 15/363; F16J 15/366
See application file for complete search history.

(56) References Cited

U.S. PATENT DOCUMENTS

| | | | |
|---|---|---|---|
| 2,520,468 A | 8/1950 | Moore | |
| 2,791,468 A | 5/1957 | Grotta | |
| 3,241,868 A | 3/1966 | Soderberg | |
| 4,176,651 A | 12/1979 | Backus | |
| 4,784,322 A | 11/1988 | Daly | |

(Continued)

FOREIGN PATENT DOCUMENTS

| | | |
|---|---|---|
| DE | 102014208620 A1 | 12/2015 |
| DE | 102014214282 | 1/2016 |

(Continued)

OTHER PUBLICATIONS

Technical Bulletin, Expansion Joints Pressure Balanced, Piping Technology & Products, Inc., www.pipingtech.com, 4 pages.

(Continued)

*Primary Examiner* — Gilbert Y Lee
(74) *Attorney, Agent, or Firm* — Greenberg Traurig, LLP

(57) ABSTRACT

A flexible metal seal assembly for isolating one or more fluids in an operative region of a machine comprises a first flexible metal seal and a second flexible metal seal arranged in series, allowing the additional exertion of a spring bias. The inner surface of the first flexible metal seal is restrainably and hermetically attached to the outer surface of a metallic coupler, while the outer surface of the second flexible metal seal is restrainably and hermetically attached to the inner surface of the metallic coupler. Amongst other applications, the assembly may be used in a valve seal, or in an engine fuel pump, where it serves to isolate lubricating oil from fuel, or one fluid from a region, where one fluid may be present on an actuator that reciprocates within the second flexible metal seal or outside of the first flexible metal seal.

36 Claims, 11 Drawing Sheets

(56) References Cited

U.S. PATENT DOCUMENTS

| | | | |
|---|---|---|---|
| 5,474,303 A | 12/1995 | Coles | |
| 5,662,335 A | 9/1997 | Larsen | |
| 5,865,091 A | 2/1999 | Domanski et al. | |
| 6,412,476 B1 | 7/2002 | Thompson et al. | |
| 6,786,254 B1 | 9/2004 | Kralick | |
| 6,851,935 B2 * | 2/2005 | Merrill | F04D 13/083 277/336 |
| 7,296,473 B2 | 11/2007 | Ishii | |
| 8,932,034 B2 * | 1/2015 | McKinney | E21B 43/128 166/105 |
| 9,534,480 B2 * | 1/2017 | Hendryx | E21B 43/128 |
| 9,657,556 B2 * | 5/2017 | Tanner | E21B 43/128 |
| 9,689,529 B2 * | 6/2017 | Meyer | F16N 29/02 |
| 2003/0145835 A1 | 8/2003 | Djordjevic | |
| 2006/0043683 A1 * | 3/2006 | Ocalan | F16K 31/426 277/636 |
| 2007/0074872 A1 | 4/2007 | Du et al. | |
| 2016/0138586 A1 | 5/2016 | Crofts et al. | |

FOREIGN PATENT DOCUMENTS

| | | |
|---|---|---|
| DE | 102015202635 A1 | 8/2016 |
| EP | 2881681 A1 | 6/2015 |
| GB | 888328 A | 1/1962 |

OTHER PUBLICATIONS

International Search Report and Written Opinion dated Mar. 28, 2018, 15 pages.

* cited by examiner

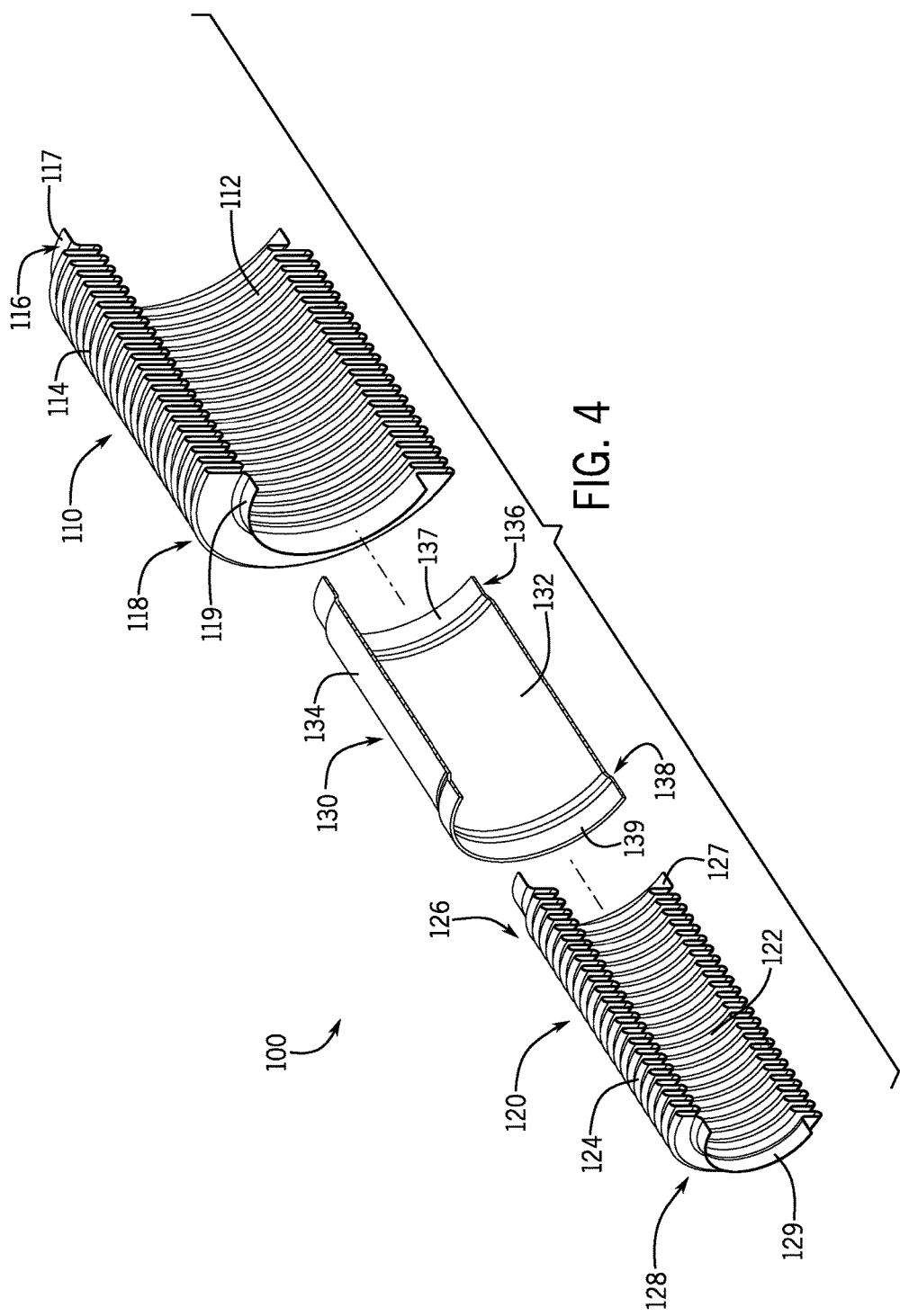

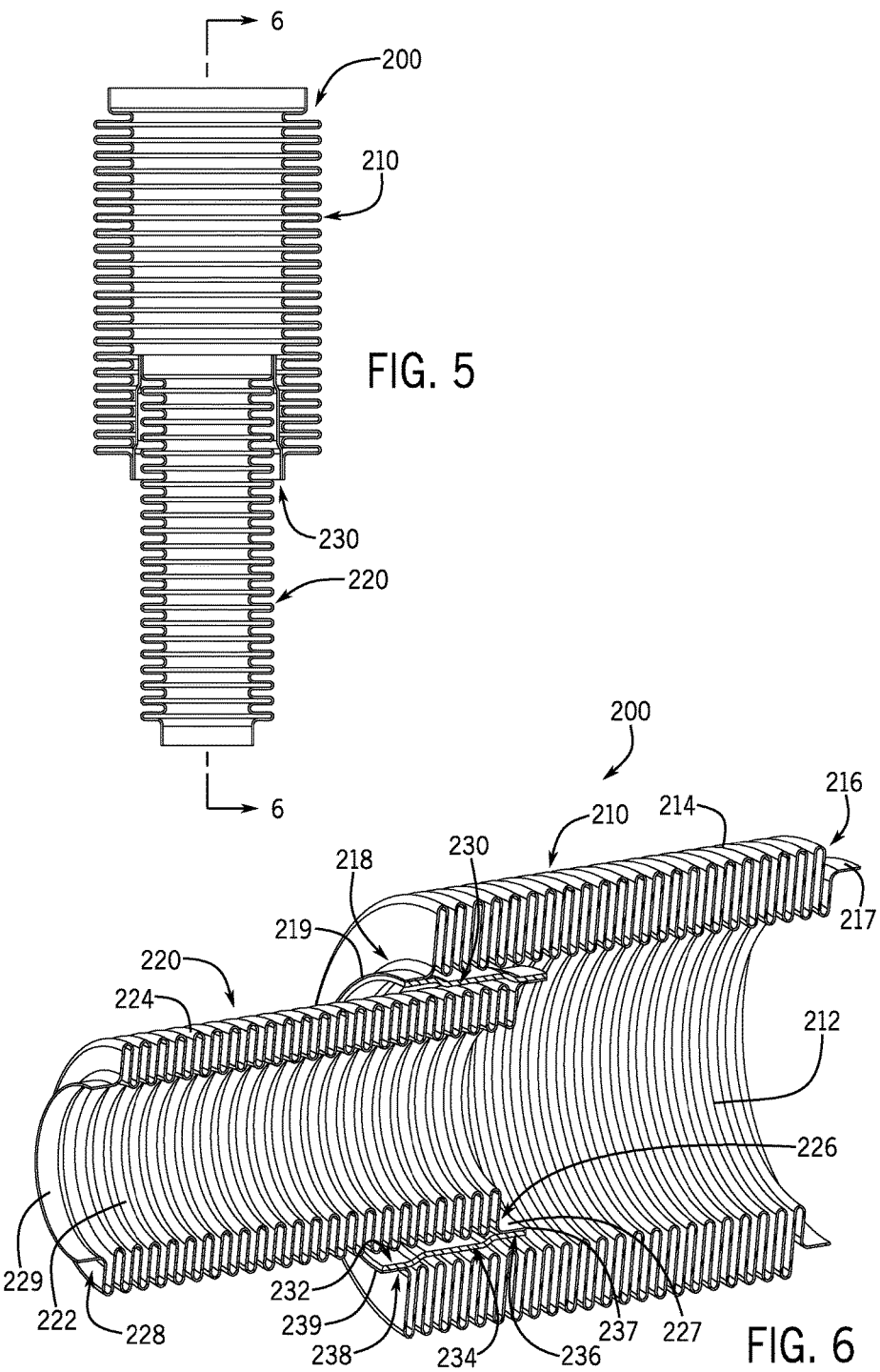

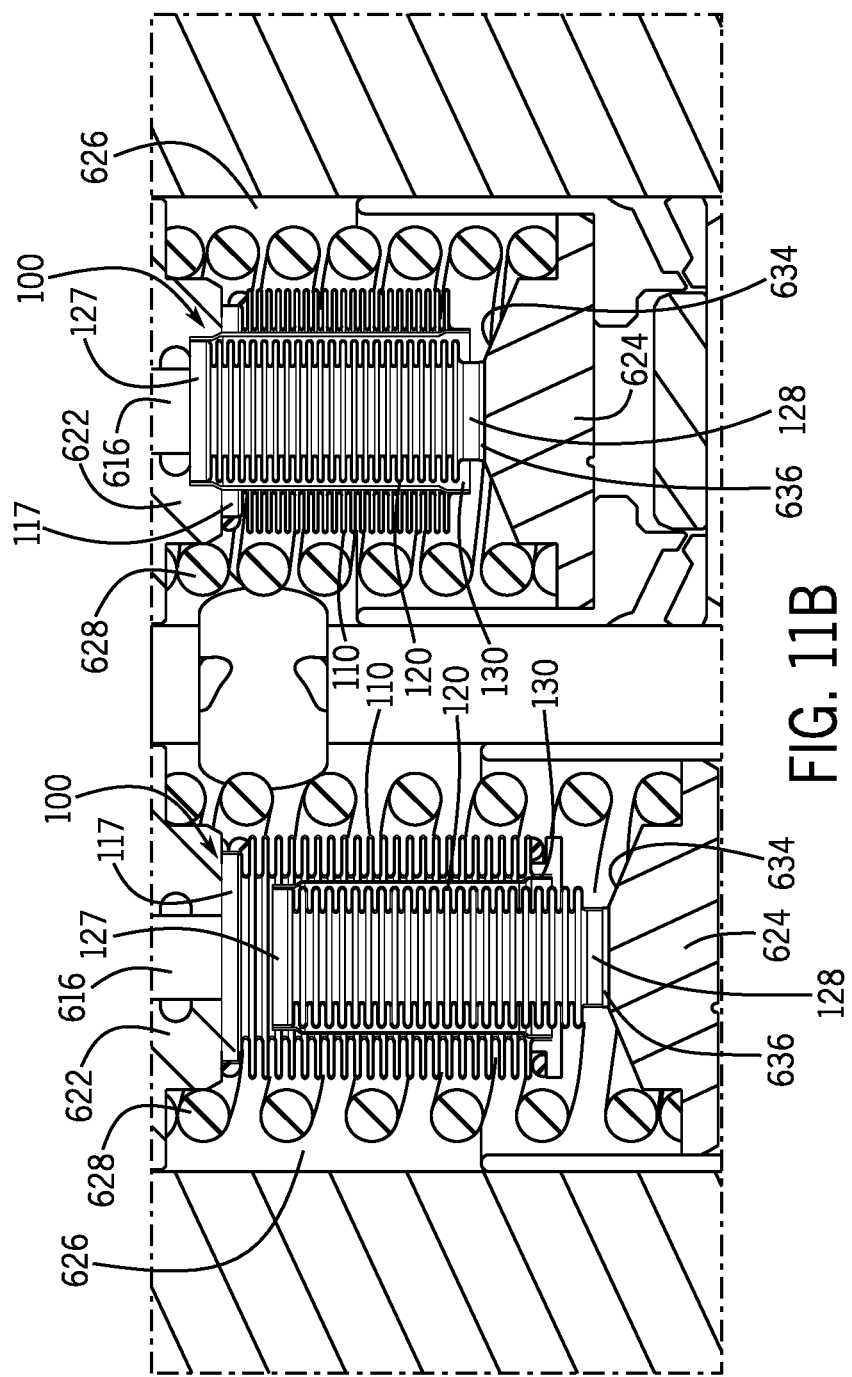

FLEXIBLE METAL SEAL ASSEMBLY

FIELD OF THE INVENTION

This invention is related to the field of flexible metal seals and flexible metal bellows, and, in particular, to the use of multiple flexible metal seals to isolate one or more fluids in the operative environment of a machine, such as a fuel pump for a diesel engine, or a valve seal.

BACKGROUND OF THE INVENTION

Amongst the prior art, it is known to use flexible metal bellows components as sealing elements for isolating fluids inside, or outside, the bellows. In such a case, each bellows may be referred to as a "seal," due to the bellows being impervious to fluids.

It is also known that such metal bellows inherently have a degree of resilience, while defining a spring constant, and can be used in pressure-sensitive devices or spring-biasing environments in lieu of, for example a compressive coiled spring. Thus, while bellows can be used to provide the same spring bias as standard spring elements, bellows seals may provide the additional benefit of imposing a spring bias, while isolating fluids within certain regions, a benefit and function that standard spring elements, such as coiled springs, simply cannot provide. The advantages of these metal bellows seal assemblies can be utilized in many different fields of use.

For example, designers of automotive engines continue to face challenges associated with improving automotive emissions, while maintaining and improving internal combustion engine longevity, integrity and fuel efficiency. As a result, today's fuel systems in internal combustion engines, such as automotive engines, operate at higher pressures than those of similar fuel systems from the past. With higher pressure needs and tolerances, fuel pump components must meet greater performance demands.

Such fuel pumps typically have a plunger or piston that reciprocates to drive the movement of fuel from a fuel inlet, into a fuel collection region, and out to an engine fuel rail through a high pressure fuel outlet. The piston is typically positioned in the bore of the fuel pump, and powered by a separate driving system, such as a motorized revolving cam shaft and lobed cam. The pump's driving system is typically supplied with a lubricant, such as oil, to lubricate the biased, reciprocating fuel pump piston against friction and wear. Since the piston has a diameter that is slightly smaller than the diameter of the bore, it is often possible for small quantities of fuel to leak out of the fuel collection region, into the space between the piston and the bore, where it may then leak into the piston driving system, where it can contaminate the lubricant. Such contamination reduces the viscosity of the lubricant, thereby decreasing the lubricant's life and overall effectiveness, to affect the friction on the piston, as well as the piston's wear and fragmentation. Likewise, once fuel and the lubricant have mixed, small volumes of lubricant may travel on the outer surface of the piston, and be purged out through high pressure fuel outlet, into the fuel rail. When such oil-contaminated fuel undergoes the combustion process in the cylinders of an internal combustion engine, it can lead to undesirable engine performance and emissions problems.

Engine designers have begun to develop improved methods for avoiding this contamination and the commingling of fuel and lubricant, such as by providing a drain groove in the bore, where leaked fuel may be collected and diverted. However, such drain grooves may not fully prevent the contamination and commingling of fuel and lubricant. Further, that solution may also cause certain pressure spikes as the piston dilates under an axial load. Accordingly, in the fuel pump context, it would be desirable to provide a fuel pump that provides an improved seal towards preventing the commingling of fuel and lubricant.

More generally, it would be desirable to provide a bellows seal assembly configured to surround a reciprocating piston in any one of a number of machine operations, which seal assembly simultaneously serves as both a resilient spring member for applying a spring load within the machine, as well as a mechanism for sealing and isolating one or more fluids from within a separate region of the machine.

SUMMARY OF THE INVENTION

In one embodiment of the present invention, a flexible metal seal assembly is used for hermetically isolating at least one fluid within an operative region of a machine. The flexible metal seal assembly comprises a first flexible metal seal positioned within the operative region, in which the first flexible metal seal has an inner surface, an outer surface, a first diameter, a first spring constant, a top end and a bottom end opposite the top end. The flexible metal seal assembly also comprises at least a second flexible metal seal positioned within the operative region, in which the second flexible metal seal has an inner surface, an outer surface, a second diameter a second spring constant, a top end and a bottom end opposite said top end. The flexible metal seal assembly further comprises at least a first substantially rigid metallic coupler having a substantially cylindrical shape, the metallic coupler having an inner surface, an outer surface, a top end and a bottom end opposite said top end.

In that embodiment, at least a first portion of the metallic coupler is restrainably and hermetically attached to the inner surface of the first flexible metal seal, and at least a second portion of the metallic coupler is restrainably and hermetically attached to the outer surface of the second flexible metal seal. The first portion of the metallic coupler is closer to the bottom end of the metallic coupler than the second portion of the metallic coupler. In that embodiment also, the first and second flexible metal seals are concentric about a common longitudinal axis, and cooperate with one another to alternatively extend and compress simultaneously, in series.

Another aspect of that embodiment is that the first spring constant is different from the second spring constant. Each of the first and second flexible metal seals are configured to serve as biasing members relative to the movement of a reciprocating actuator located within the operative region, and the actuator is positioned substantially along the common longitudinal axis. The compression of the first flexible metal seal occurs during the compression of the second flexible metal seal, and the extension of the first flexible metal seal occurs during the extension of the second flexible metal seal. In this way, the first and second flexible metal seals jointly describe a dual seal in series that limits the migration of a first fluid located within the operative region.

In another embodiment of the invention, the first diameter of the first flexible metal seal is larger than the second diameter of the second flexible metal seal. In a different embodiment, the first and second flexible metal seals each comprise fluid impervious bellows elements.

In one embodiment of the invention, the first fluid is a machine lubricant. In another embodiment, that machine lubricant is oil. In yet a different embodiment, the at least one fluid further comprises a second fluid, located within the operative region, isolated from contact with the first fluid by the flexible metal seal assembly. In another embodiment, the second fluid is diesel fuel.

In yet another embodiment of the invention, the second flexible metal seal is configured to be fully telescopically received within the first flexible metal seal. In a different embodiment, the second flexible metal seal is configured to be partially telescopically received within the first flexible metal seal.

In a different embodiment of the invention, the second portion of the metallic coupler is restrainably and hermetically attached to the top end of the second flexible metal seal and the first portion of the metallic coupler is restrainably and hermetically attached to the bottom end of the first flexible metal seal, and the top end of the second flexible metal seal is incapable of deflecting axially beyond the bottom end of the first flexible metal seal, rendering the second flexible metal seal incapable of being telescopically received within the first flexible metal seal.

In another embodiment of the invention, the first spring constant and the second spring constant combine in series to form an equivalent spring constant that exerts a spring bias force. In one embodiment, the spring bias force is exerted against a piston in contact with a cam follower in a fuel pump for a diesel engine. In a different embodiment, the spring bias force is exerted against a valve seal. In yet another embodiment, the second portion of the metallic coupler is restrainably and hermetically attached to the top end of the second flexible metal seal. In an alternative embodiment, the first portion of the metallic coupler is restrainably and hermetically attached to the bottom end of the first flexible metal seal.

In one embodiment, the first flexible metal seal, the metallic coupler and the second flexible metal seal are made from one of the following alloys: stainless steel, Inconel, nickel, copper and bronze. In another embodiment, the ratio between said first spring constant and said second spring constant ranges from about 1.2:1 to about 3:1. In yet another embodiment, the ratio of axial deflection of the first flexible metal seal and the second flexible metal seal ranges from about 33% to about 83%. In a different embodiment, the metallic coupler is restrainably and hermetically attached to each of the first and second flexible metal seals by either welding or brazing.

The invention can further comprise a third flexible metal seal positioned within the operative region, in which the third flexible metal seal has an inner surface, an outer surface, a third diameter, a third spring constant, a top end and a bottom end opposite said top end. The invention in that embodiment also comprises a second substantially rigid metallic coupler having a substantially cylindrical shape, with that second metallic coupler having an inner surface, an outer surface, a top end and a bottom end opposite the top end. In that embodiment also, the first, second and third flexible metal seals are positioned concentrically about a common longitudinal axis, and cooperate with each other to alternatively extend and compress simultaneously, in series, and at least one of the first, second and third spring constants is different from another of the first, second and third spring constants. Each of the first, second and third flexible metal seals is configured to serve as a biasing member relative to the movement of a reciprocating actuator located within the operative region, positioned substantially along the common longitudinal axis, and the compression of the first, second and third flexible metal seals occurs simultaneously, while the expansion of said first, second and third flexible metal seals also occurs simultaneously. In this way, the first, second and third flexible metal seals jointly describe a triple seal to limit the migration of a first fluid within said operative region.

In an embodiment having three flexible metal seals, the first diameter of the first flexible metal seal is larger than the second diameter of the second flexible metal seal, and the second diameter of the second flexible metal seal is larger than the third diameter of the third flexible metal seal. In that embodiment also, at least a first portion of the second metallic coupler is restrainably and hermetically attached to the inner surface of the second flexible metal seal, and at least a second portion of the second metallic coupler is restrainably and hermetically attached to the outer surface of the third flexible metal seal. The first portion of the second metallic coupler is positioned closer to the bottom end of the second metallic coupler than the second portion of the second metallic coupler.

In another embodiment having three flexible metal seals, the first diameter of the first flexible metal seal is larger than the second diameter of the second flexible metal seal, and the second diameter of said second flexible metal seal is substantially equal to the third diameter of the third flexible metal seal. In that embodiment, at least a first portion of the first metallic coupler is restrainably and hermetically attached to the inner surface of the first flexible metal seal, and at least a second portion of the second metallic coupler is also restrainably and hermetically attached to the inner surface of the first flexible metal seal at a position substantially opposite the first portion. Further, the first metallic coupler is restrainably and hermetically attached to the outside top end of the second flexible metal seal, and the second metallic coupler is restrainably and hermetically attached to the outside bottom end of the third flexible metal seal. In one embodiment having only two flexible metal seals, the first diameter of the first flexible metal seal and the second diameter of the second flexible metal seal are substantially equal in dimension.

In yet another embodiment, the flexible metal seal assembly is configured for use for hermetically isolating at least one fluid within an operative region of a machine, and the flexible metal seal assembly comprises a first flexible metal seal configured for orientation within the operative region, a second flexible metal seal configured for orientation within the operative region, and a first substantially rigid metallic coupler having a substantially cylindrical shape. The first flexible metal seal has an inner surface, an outer surface, a first diameter, a first spring constant, a top end and a bottom end opposite the top end. Likewise, the second flexible metal seal has an inner surface, an outer surface, a second diameter, a second spring constant and a top end and a bottom end opposite the top end. The first metallic coupler has an inner surface, an outer surface, a top end and a bottom end opposite the top end. In this embodiment, at least a first portion of the metallic coupler is restrainably and hermetically attached to the inner surface of the first flexible metal seal, and at least a second portion of the metallic coupler is restrainably and hermetically attached to the outer surface of the second flexible metal seal, where the first portion of the metallic coupler is closer to the bottom end of the metallic coupler than the second portion of the metallic coupler. The first and second flexible metal seals are concentric about a common longitudinal axis, and cooperate with one another to alternatively extend and compress simultaneously, in series.

In this embodiment also, the first spring constant is different from the second spring constant, and each of the first and second flexible metal seals are configured to serve as a biasing member relative to the movement of a reciprocating actuator located within the operative region, positioned substantially along the common longitudinal axis. In this way, the compression of the first flexible metal seal and the compression of the second flexible metal seal occur simultaneously, and the expansion of the first flexible metal seal and the second flexible metal seal occur simultaneously. Thus, the first and second flexible metal seals jointly describe a dual seal to limit the migration between a first fluid isolated within the second flexible metal seal and a second fluid isolated outside of the first flexible metal seal. In that embodiment, the first and second flexible metal seals can each comprise fluid impervious bellows elements, the first fluid is oil, and the second fluid is a fuel. In one preferred embodiment, the second flexible metal seal is configured to be at least partially telescopically received within the first flexible metal seal.

In another embodiment, the flexible metal seal assembly is configured to hermetically isolate at least one fluid within an operative region of a machine, and the flexible metal seal assembly comprises a first flexible metal seal configured for orientation within the operative region, a second flexible metal seal configured for orientation within the operative region, and a first substantially rigid metallic coupler having a substantially cylindrical shape. The first flexible metal seal has an inner surface, an outer surface, a first diameter, a first spring constant, a top end and a bottom end opposite the top end. Likewise, the second flexible metal seal has an inner surface, an outer surface, a second diameter, a second spring constant and a top end and a bottom end opposite the top end. The first metallic coupler has an inner surface, an outer surface, a top end and a bottom end opposite the top end. In that embodiment also, at least a first portion of the metallic coupler is restrainably and hermetically attached to the inner surface of the first flexible metal seal, and at least a second portion of the metallic coupler is restrainably and hermetically attached to the outer surface of the second flexible metal seal, the first portion of the metallic coupler being closer to the bottom end of the metallic coupler than the second portion of said metallic coupler.

In this embodiment, the first and second flexible metal seals are concentric about a common longitudinal axis, and cooperate with one another to alternatively extend and compress simultaneously, in series. The first spring constant is different from the second spring constant, and each of the first and second flexible metal seals are configured to serve as biasing members, relative to the movement of a reciprocating actuator located within the operative region, positioned substantially along the common longitudinal axis. In this way, the compression of the first flexible metal seal and the compression of the second flexible metal seal occur simultaneously, and the expansion of the first flexible metal seal and the second flexible metal seal occur simultaneously.

The first and second flexible metal seals jointly describe a dual seal to limit the migration between a first fluid isolated within the second flexible metal seal and a second fluid isolated outside of the first flexible metal seal. In that embodiment, the first and second flexible metal seals each comprise fluid impervious bellows elements, and the first and second flexible metal seals jointly describe a dual seal assembly, in which the first spring constant and the second spring constant combine to form an equivalent spring constant that exerts a spring bias force against a valve seal.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 4 of the drawings shows a perspective, exploded cross sectional view of the inventive flexible metal seal assembly of FIGS. 2A, 3A and 3B, showing the primary components of the flexible metal seal assembly, namely, a first flexible metal seal, a second flexible metal seal, and a metallic coupler element operably positioned therebetween, having a substantially cylindrical shape.

FIG. 5 of the drawings shows an elevated view of an alternative embodiment of the flexible metal seal assembly shown in FIGS. 2-4, shown partially in cutaway depicting the second flexible metal seal being only partially embedded for reciprocation within the first flexible metal seal.

FIG. 6 of the drawings shows an elevated cross sectional view of the inventive flexible metal seal assembly embodiment of FIG. 5, taken along line 6-6 and looking in the direction of the arrows, where the flexible metal seal assembly is shown in its partially compressed position, corresponding to that shown in FIG. 5.

FIG. 11B of the drawings shows an enlarged elevated cross-sectional view of the inventive flexible metal seal assembly shown in FIG. 10, showing flexible metal seals in both extended and compressed orientation in side-by-side reciprocating piston environments.

DETAILED DESCRIPTION OF THE DRAWINGS

Reference will now be made in detail to the preferred embodiments of the invention, examples of which are illustrated in the accompanying drawings. While the invention will be described in conjunction with the preferred embodiments, it will be understood that it is not intended to limit the invention to these embodiments. To the contrary, the invention is intended to cover alternatives, modifications and equivalents, which may be included within the spirit and scope of the invention, as defined by the claims. Further, to the extent that any numerical values or other specifics of materials, etc., are provided herein, they are to be construed as exemplifications of the inventions herein, and the inventions are not to be considered as limited thereby. Furthermore, in the detailed description of the present invention, numerous specific details are set forth, in order to provide a thorough understanding of the present invention. However, it will be obvious to one of ordinary skill in the art that the present invention may be practiced without these specific details. In other instances, well known methods, procedures, and components have not been described in detail so as to not unnecessarily obscure the aspects of the present invention.

Figure 1:
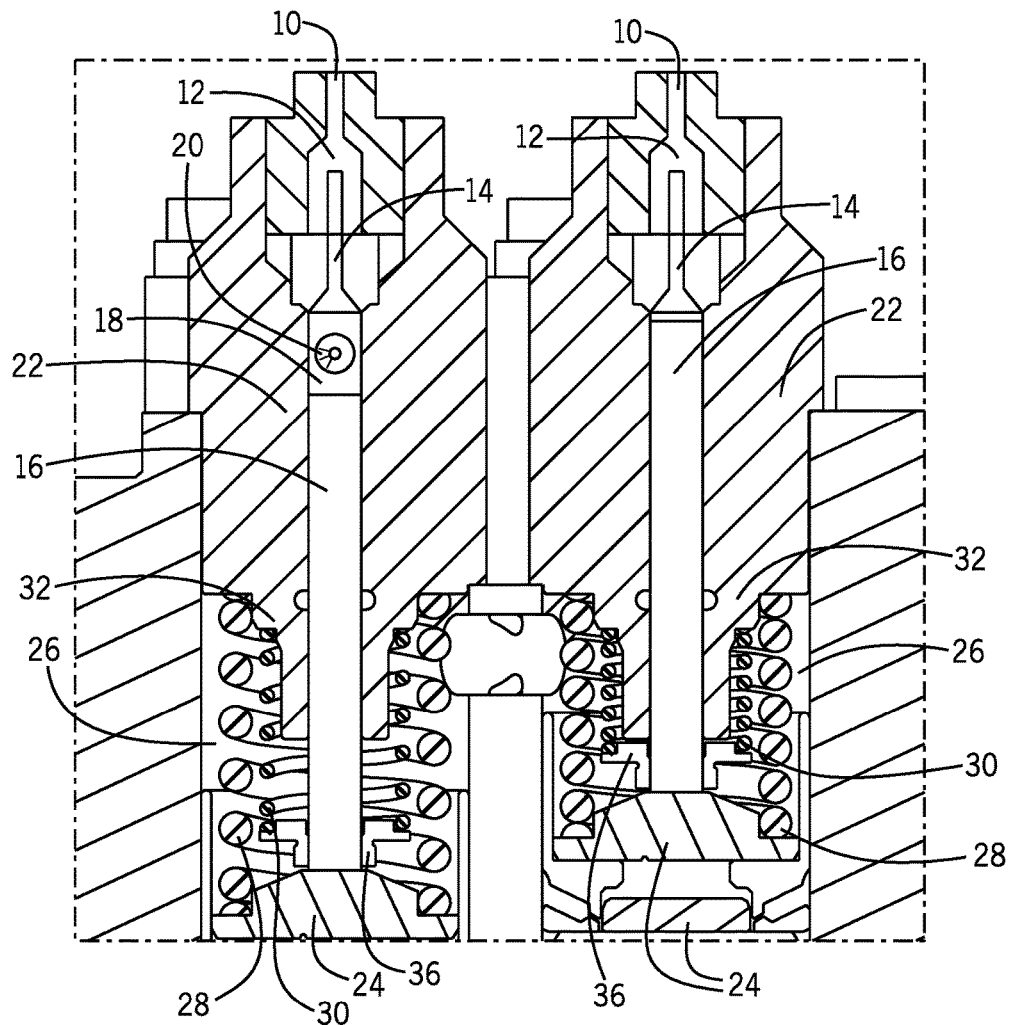
FIG. 1 of the drawings shows an elevated cross-sectional view of the piston region of a prior art fuel pump for a diesel engine.

FIG. 1 shows an elevated cross sectional view of a conventional fuel pump for a diesel engine. At the top of the fuel pump, fuel enters at fuel inlets 10 into fuel collection regions 12. As the fuel pump operates and pistons 16 reciprocate downwardly, the fuel is drawn through check valves 14 into fuel pumping region 18 where high pressure fuel outlet 20 is located. In the view shown in FIG. 1, high pressure fuel outlet extends into the z-axis (i.e., into the paper). Because the fuel is extracted through check valves 14 and into fuel pumping region 18, where pistons 16 reciprocate, a small amount of fuel may migrate and coat a portion of the outer surface of pistons 16.

Pistons 16 reciprocate up and down within piston guides 22. At their lower ends, pistons 16 are attached to cam followers 24, which are biased downwardly by outer springs 28—to reciprocate up and down as a result of the rotation actions of the cams (not shown if FIG. 1), which are located further below cam followers 24. In spring bias regions 26, in which pistons 16 and springs 28, 30 are operably positioned, outer springs 28 and inner springs 30 have their own spring constants. At their upper ends, outer springs 28 and inner springs 30 each bear against a bearing surface on the bottom end 32 of piston guides 22, and each exert a spring bias downwardly against cam followers 24 and piston retainers 36, respectively. Notably, oil is present within spring bias regions 26, and serves as a lubricant to enable the free movement of cam followers 24, pistons 16, and spring elements 28 and 30, amongst other things.

In this conventional construction of a diesel engine fuel pump it is possible that the fuel and the lubricating oil can mix in spring bias regions 26, because the fuel that can migrate to coat portions of the outer surface of pistons 16. This mixing of fuel and lubricating oil means that lubricating oil may also travel upwardly on the outer surface of pistons 16, to make its way out through the high pressure fuel outlets 20, towards the fuel rails of the diesel engine. When such oil-contaminated fuel undergoes the combustion process in the combustion chamber of the diesel engine, it can lead to undesirable emissions problems, as well as affect the combustion process to detrimentally affect engine performance. Likewise, the diesel fuel located on the outer surface of pistons 16 may contaminate the lubricating oil within spring bias regions 26. As a result, such fuel-contaminated lubricating oil may not effectively lubricate components within that region, leading to decreased efficiency, and increased wear on those components to foster metal fragmentation.

Figure 2B:
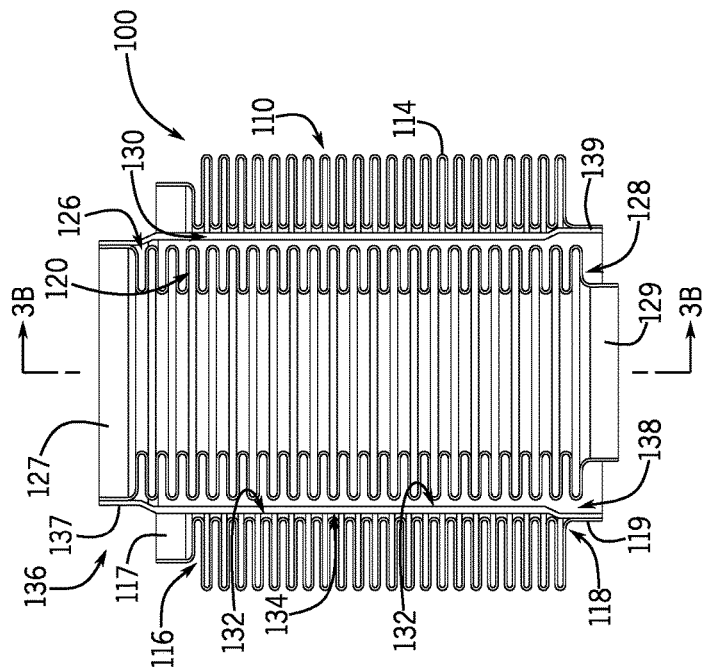
FIG. 2B of the drawings shows an elevated cutaway view, showing the embodiment of FIG. 2A of the inventive flexible metal seal assembly, in its compressed position.
Figure 2A:
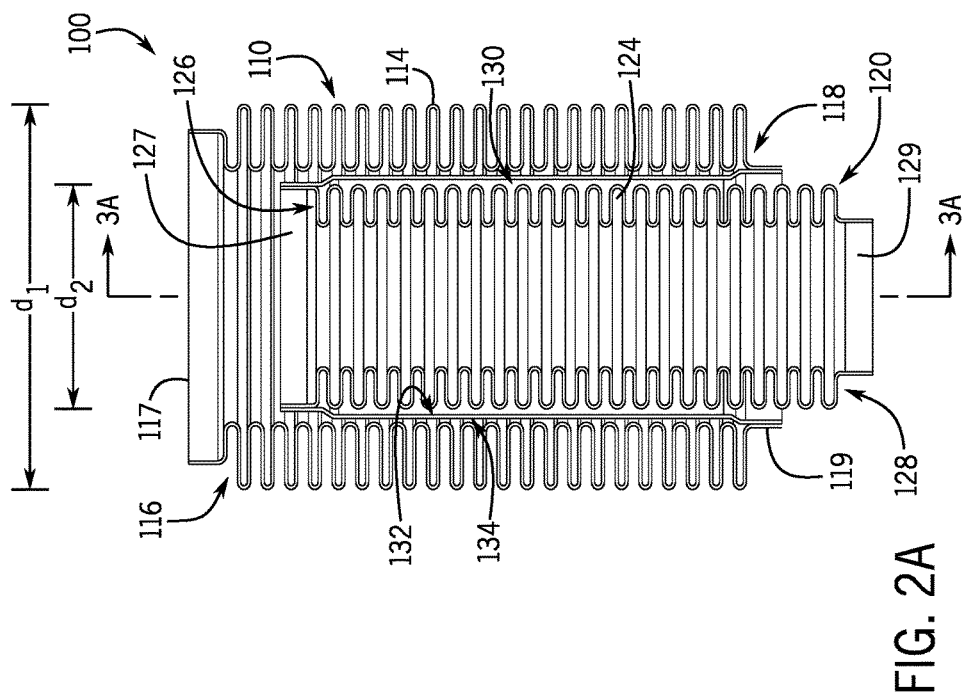
FIG. 2A of the drawings shows an elevated cutaway view of one embodiment of the inventive flexible metal seal assembly in its extended or expanded (uncompressed) position, where the flexible metal seal assembly includes at least two flexible metal seals and is shown partially in cutaway to depict the second flexible metal seal having a smaller diameter than, and being fully embedded within, the first flexible metal seal.
Figures 3A, 3B:
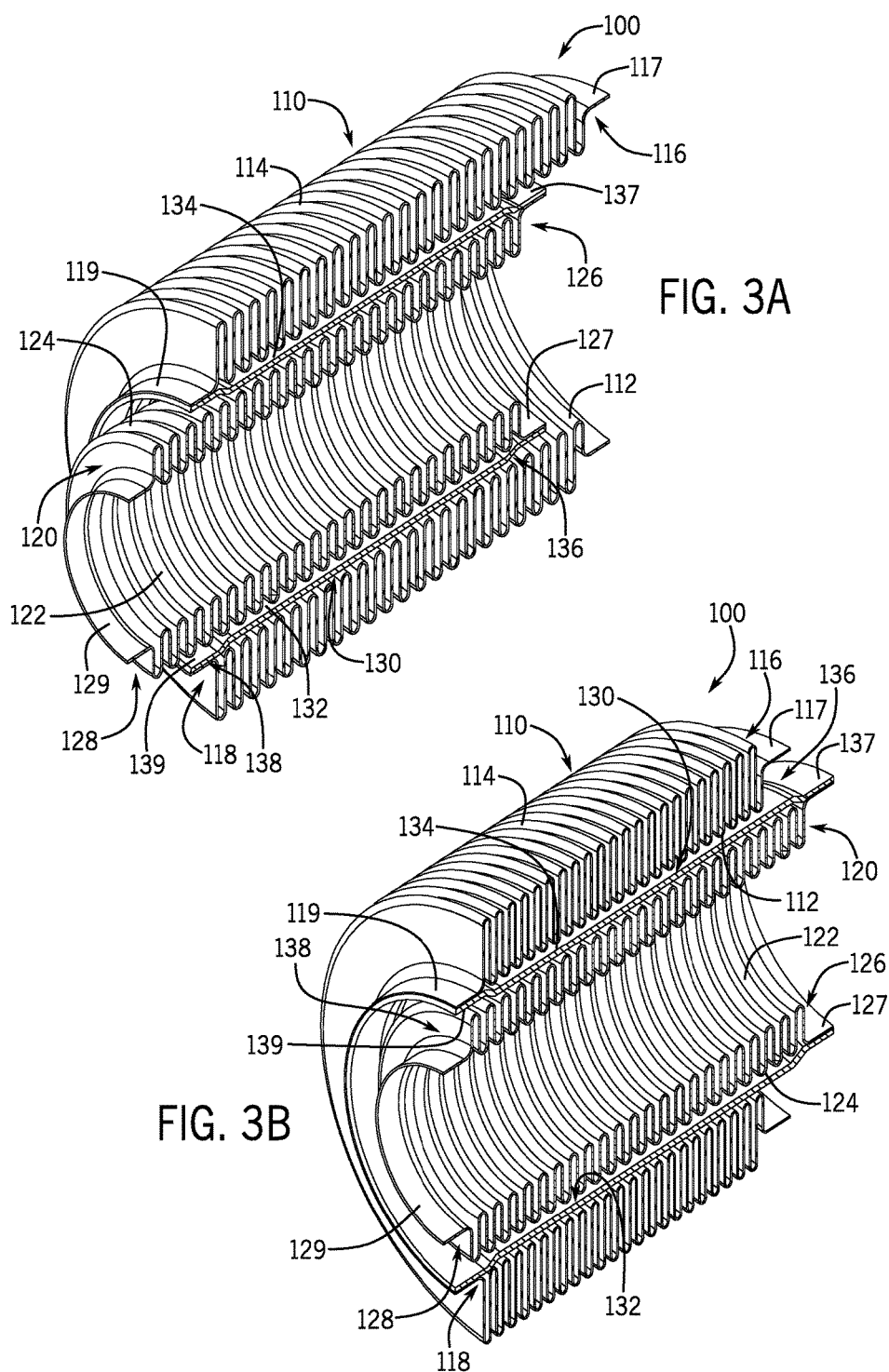
FIG. 3A of the drawings shows a perspective cross sectional view of the inventive flexible metal seal assembly of FIG. 2A, taken along line 3A-3A and looking in the direction of the arrows, where the flexible metal seal assembly is shown in its extended (uncompressed) position, corresponding to that shown in FIG. 2A.
FIG. 3B of the drawings shows a perspective cross sectional view of the inventive flexible metal seal assembly of FIG. 2B, taken along line 3B-3B and looking in the direction of the arrows, where the flexible metal seal assembly is shown in its compressed position, corresponding to that shown in FIG. 2B.

FIGS. 2A and 2B show one preferred embodiment of inventive flexible metal seal assembly 100 in its extended and compressed positions, respectively. FIGS. 3A and 3B show the same embodiment of flexible metal seal assembly 100 in its extended and compressed positions, respectively. FIG. 4 depicts the same embodiment of flexible metal seal assembly 100 in an exploded view, to clearly show the three main components thereof. Accordingly, FIGS. 2 through 4 collectively depict various views of the same embodiment of flexible metal seal assembly 100.

In FIGS. 2 through 4, flexible metal seal assembly 100 comprises first flexible outer metal seal 110 and second flexible inner metal seal 120, which are coupled to one another by intermediary metallic coupler 130. First flexible metal seal 110, second flexible metal seal 120 and metallic coupler 130 may be manufactured from any number of alloys, including 300 series stainless steel, including stainless steel grade 316L, a corrosion-resistant alloy such as Inconel, and/or any one of a number of suitable copper, nickel or bronze alloys. The coupling of each of first flexible metal seal 110 and second flexible metallic seal 120 to intermediary coupler 130 may be accomplished by conventional welding or brazing techniques, at their respective top ends 116, 126 and 136 and bottom ends 118, 128 and 138, respectively. Further, respective outer seal top and bottom collars 117 and 119, inner seal top and bottom collars 127, 129, and coupler top and bottom collars 137, 139 are joined in succession as shown in FIG. 3A.

The diameter $d_1$ of first flexible outer metal seal 110 is larger than diameter $d_2$ of second flexible metal seal 120. In an alternative embodiment (not shown), diameter $d_1$ of first flexible metal seal 110 is equal to diameter $d_2$ of second flexible inner metal seal 120. In this embodiment, second flexible metal seal 120 will not telescopically nest within first flexible metal seal 110.

In seal assembly 100 shown in FIGS. 2-4, first and second flexible metal seals 110 and 120, respectively, are concentric about a common longitudinal axis, which axis is reflected in FIGS. 2A and 2B as line 3A-3A and line 3B-3B, respectively. In the embodiment of flexible metal seal assembly 100, second flexible metal seal 120 is configured to be fully telescopically received within first flexible metal seal 110.

Metallic coupler 130 has a substantially cylindrical shape, as well as an inner surface and an outer surface, namely inner surface 132 and outer surface 134. Metallic coupler 130 also comprises top end 136 and bottom end 138. Inner surface 132 and outer surface 134 are used to restrainably and hermetically attach metallic coupler 130 to first and second flexible metal seals 110 and 120, in succession.

More specifically, first flexible metal seal 110 has an inner surface and an outer surface, namely, inner surface 112 and outer surface 114. Likewise, second flexible metal seal 120 has an inner surface and an outer surface, namely, inner surface 122 and outer surface 124. In the embodiment shown in FIGS. 2 through 4, outer surface 124 of second flexible metal seal 120 is restrainably and hermetically attached at top collar 127 to inner surface 132 of top collar 137 at top end 138 of metallic coupler 130. Further, the outer surface 134 of bottom collar 139 of metallic coupler 130 is restrainably and hermetically attached to inner surface 112 of bottom collar 119 of first flexible metal seal 110, as also shown in FIG. 3A.

In the finished position of flexible metal seal assembly 100 within a machine, bottom end 128 of second flexible metal seal assembly 120 is hermetically sealed to a sealing element (such as sealing element 636 in FIG. 11B). Likewise, top end 116 of first flexible metal seal assembly 110 is hermetically sealed to a similar type of sealing element. Based on this coupling and hermetic sealing arrangement, fluid that is present inside, and that bears upon inner surface 122 of, second flexible metal seal 120 cannot travel to a location where it would also bear upon either outer surface 124 of second flexible metal seal 120, or outer surface 114 of first flexible metal seal 110. The fluid would be blocked at bottom end 128 of second flexible metal seal assembly 120 by the sealing element, but would not be blocked at top end 126 of second flexible metal seal assembly 120 where such fluid can migrate over top end 126 into metallic coupler 130, along its outer surface 134 and into contact with inner surface 112 of flexible metal seal 110. However, migration of any such fluid from within the inner surface 112 of flexible metal seal 110 would be blocked where bottom collar 129 is sealed to the sealing element by a continuous weld or bead, such as sealing element 636 in FIG. 11B.

Moreover, this coupling and hermetic sealing arrangement likewise ensures, in like fashion, that fluid that is present on either outer surface 114 of first flexible metal seal 110 or outer surface 124 of flexible metal seal 120 is blocked from traveling inside of first flexible metal seal 110 or second flexible metal seal 120. Any such fluid is blocked from travelling to a location where it would also bear upon inner surface 114 of first flexible metal seal 110, or inner surface 124 of flexible metal seal 120, as such fluid would be blocked at bottom end 128 of second flexible metal seal 120 by the respective sealing element (such as sealing element 636 in FIG. 11B), though it could scale bottom end 118 of first flexible metal seal assembly 110. While such fluid can migrate into contact with outer surface 124 of metal seal 120, it is blocked from entering the interior of second flexible metal seal 120 by the hermetic seal and attachment between top collar 137, at top end 136 of metallic coupler 130, and top collar 127 of second (inner) flexible metal seal 120—where it is brazed or welded together.

First and second flexible metal seals 110 and 120 each comprise bellows elements having convolutions, which cause those bellows elements to have a certain degree of resiliency defined by a spring constant. The spring constant of a given bellows element may depend on many factors, including the diameter of the bellows, the material from which the bellows is manufactured, the thickness of the bellows walls, the number of plies of material in the bellows walls, the shape of the bellows convolutions, and the number of convolutions, among other factors.

First flexible metal seal 110 has a first spring constant $k_1$ and second flexible metal seal 120 has a second spring constant $k_2$. In a preferred embodiment of the invention, first spring constant $k_1$ of first flexible metal seal 110 is materially different from second spring constant $k_2$ of second flexible metal seal 120. This difference between spring constants $k_1$ and $k_2$ enables first and second flexible metal seals 110 and 120 to deflect (both by way of extension and compression) at different rates. As such, first and second flexible metal seals 110 and 120 may be designed to enable them to displace in the same direction, with the first and second seal compressing simultaneously, or alternatively expanding or extending simultaneously, by different amounts. In that manner, each flexible metal seal endures forces and pressures specific to what it can handle to ensure maximum life span. In that manner also, the different metal seals, with their distinctly different spring constants, can be selected and "tuned" to maximize their respective life spans, once their exposure to load and displacement is determined.

As one of skill in the art will appreciate, the structural orientation of flexible metal seal assembly 100 shown in FIGS. 2 through 4 dictates that first and second flexible metal seals 110 and 120 are not only arranged, but also operate, in series. As described above, when they are so arranged, first and second flexible metal seals 110 and 120 both expand (extend) or compress simultaneously, such that the compression of first flexible metal seal 110 occurs at the same time as the compression of second flexible metal seal 120, and the expansion of first flexible metal seal 110 occurs at the same time as the expansion of second flexible metal seal 120. Likewise, the compression of second flexible metal seal 120 occurs simultaneously to the compression of first flexible metal seal 110, and the expansion of second flexible metal seal 120 occurs simultaneously to the expansion of first flexible metal seal 110.

As one of skill in the art will also appreciate, arranging two flexible metal seals in series, as shown in the arrangement of FIGS. 2-4, will result in a single spring constant that is formulaically equivalent to the combined spring constants of the individual flexible metal seals. Where flexible metal seal 110 has a first spring constant $k_1$ and second flexible metal seal 120 has a second spring constant $k_2$, one of skill in the art would recognize, the equivalent spring constant $k_{eq}$ of the combined spring constants $k_1$ and $k_2$, when the two springs or bellows are arranged in series, can be determined using the following equation:

$$\frac{1}{k_{eq}} = \frac{1}{k1} + \frac{1}{k2}$$

Flexible metal seal assembly 100 can therefore be configured to serve as a biasing member with an equivalent spring constant $k_{eq}$, biasing the movement of a reciprocating actuator positioned along the same longitudinal axis as first and second flexible metal seals 110 and 120, and located within the diameter $d_2$ of second flexible metal seal 120.

FIGS. 5 and 6 show another preferred embodiment of inventive flexible metal seal assembly 200. In contrast with flexible metal seal assembly 100, shown in FIGS. 2-4, which is configured to allow for second flexible metal seal 120 to be fully telescopically received within first flexible metal seal 110, flexible metal seal assembly 200 is configured to allow for only partial telescopic receipt of second flexible metal seal 220 within first flexible metal seal 210, as controlled by the length and shape of metallic coupler 230. In all other respects, the components and arrangement of flexible metal seal assembly 200 are similar to the components and arrangement of flexible metal seal assembly 100.

Flexible metal seal assembly 200 comprises first flexible metal seal 210 and second flexible metal seal 220, which are coupled together by way of metallic coupler 230. The diameter $d_1$ of first flexible metal seal 210 is larger than the diameter $d_2$ of second flexible metal seal 220. First and second flexible metal seals 210 and 120 are concentric about a common longitudinal axis, which axis is reflected in FIG. 5 as line 6-6.

Metallic coupler 230 is similar to metallic coupler 130, but the axial length of metallic coupler 230 can be significantly shorter than the length of metallic coupler 130, thus ensuring that second flexible metal seal 220 cannot be fully telescopically received within first flexible metal seal 210. Outer surface 234 of metallic coupler 230 is restrainably and hermatically attached, such as by continuous braze or weld, at bottom end 238, to inner surface 212 of first flexible metal seal 210, at bottom collar 219 of flexible metal seal 210. Further, inner surface 232 of metallic coupler 230 is restrainably and hermatically attached, at top end 236, to outer surface 224 of second flexible metal seal 220, at its top collar 227. When flexible metal seal assembly 200 is combined with sealing elements that hermetically seal bottom end 228 of second flexible metal seal assembly 220 and top end 216 of first flexible metal seal assembly 210 (such as sealing element 636 in FIG. 11B), this sealing arrangement prevents fluid located inside second flexible metal seal 220 from commingling with fluid located outside both first and second flexible metal seals 210, 220.

As shown in FIGS. 5 and 6, first and second flexible metal seals 210 and 220 have first spring constant $k_1$ and second spring constant $k_2$, respectively. In the invention, first spring constant $k_1$ is materially different from second spring constant $k_2$, thus enabling first and second flexible metal seals 210 and 220 to deflect (both by way of expansion and compression) at different rates.

Figure 7:
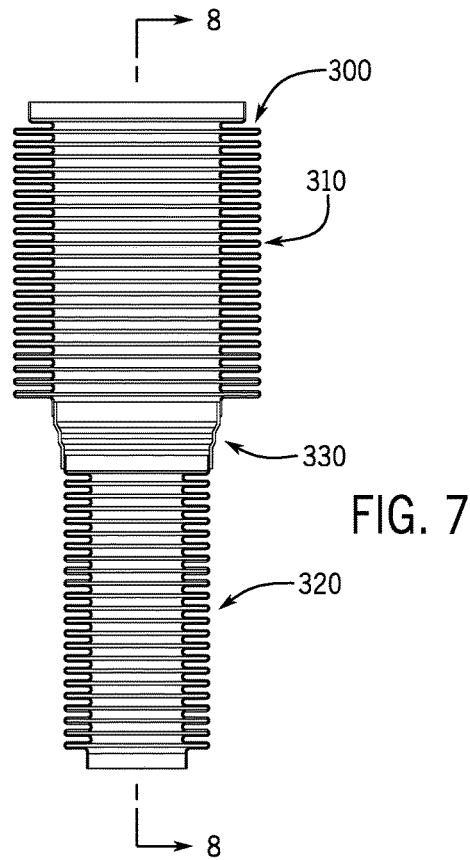
FIG. 7 of the drawings shows an elevated view of another alternative embodiment of the inventive flexible metal seal assembly, in which the second flexible metal seal is not embedded within the first flexible metal seal at all, regardless of whether the two or more seals are fully extended or fully compressed within the operable machine region.
Figure 8:
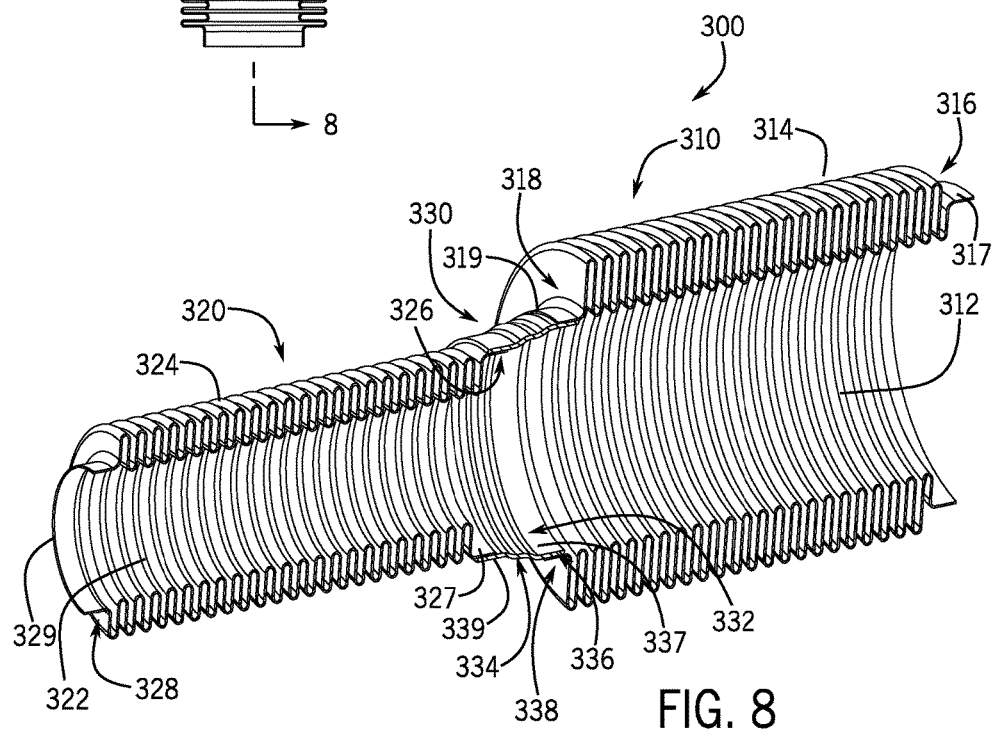
FIG. 8 of the drawings shows a perspective cross sectional view of the inventive flexible metal seal assembly of FIG. 7, taken along line 8-8 and looking in the direction of the arrows, where the flexible metal seal assembly is shown in its partially extended position, corresponding to that shown in FIG. 7.

FIGS. 7 and 8 show yet another preferred embodiment of inventive flexible metal seal assembly 300. In contrast with flexible metal seal assemblies 100 and 200, which are configured to allow for second flexible metal seal 120 and 220 to be at least partial telescopically received or nested within first flexible metal seals 110 and 210, respectively, flexible metal seal assembly 300 is configured so as to preclude any telescopic receipt of second flexible metal seal 320 within first flexible metal seal 310.

First and second flexible metal seals 310 and 320 are again concentric about a common longitudinal axis, which axis is reflected in FIG. 7 as line 8-8. Outer surface 334 of metallic coupler 330 is restrainably and hermatically attached, at top end 336 of metallic coupler 330, to inner surface 312 of first flexible metal seal 310, although it can likewise be so attached to outer surface 314 of first flexible metal seal 310. Further, inner surface 332 of metallic coupler 330 is restrainably and hermatically attached, at bottom end 338 of metallic coupler 330, to outer surface 324 of second flexible metal seal 320, at its top collar 327, although it can likewise be attached to inner surface 322 of second flexible metal seal 310. This sealing arrangement again prevents fluid located inside either of first or second flexible metal seals 310 and 320 from commingling with fluid located outside first or second flexible metal seals 310 and 320. As such, top end 326 of second flexible metal seal 320 does not deflect axially beyond or into bottom end 318 of first flexible metal seal 310. In this fashion, second flexible metal seal 320 is incapable of being telescopically received within first flexible metal seal 310. While the embodiments of FIGS. 7 and 8 show first and second metal seals of disparate diameters, the invention further contemplates the use of first and second metal seals having substantially the same diameter—albeit with materially different spring constants between the two or more flexible metal seals.

As stated above, the concepts disclosed herein are not limited to two and only two flexible metal seals. In yet another preferred embodiment of the invention shown in FIG. 9, flexible metal seal assembly 400 includes a third flexible metal seal 440, as well as a second metallic coupler 450. The sealing arrangement concept defined by using first and second flexible metal seals 410 and 420, which are sealed together using metallic coupler 430, is repeated and carried forward by sealing second flexible metal seal 420 to third flexible metal seal 440, using second metallic coupler 450.

Specifically, third flexible metal seal 440 includes outer surface 444, which is restrainably and hermetically attached to inner surface 452 of second metallic coupler 450. Likewise, outer surface 454 of second metallic coupler 450 is restrainably and hermetically attached to inner surface 422 of second flexible metal seal 420. Each of first, second and third flexible metal seals 410, 420 and 440 are concentric about a common longitudinal axis, are arranged in series and cooperate with each other so as to alternatively extend (expand) simultaneously, as well as to compress simultaneously, in use within a respective machine region.

Moreover, each of first, second and third flexible metal seals 410, 420 and 440 has its own spring constant $k_1$, $k_2$ and $k_3$, respectively, with at least two of the three spring constants being different from each other. Thus, flexible metal seal assembly 400 serves to bias the movement of a reciprocating actuator positioned along the common longitudinal axis. As one of skill in the art would appreciate, the equivalent spring constant $k_{eq}$ of the combined flexible metal seal assembly 400 is described by the following equation:

$$\frac{1}{keq} = \frac{1}{k1} + \frac{1}{k2} + \frac{1}{k3}$$

Figure 9:
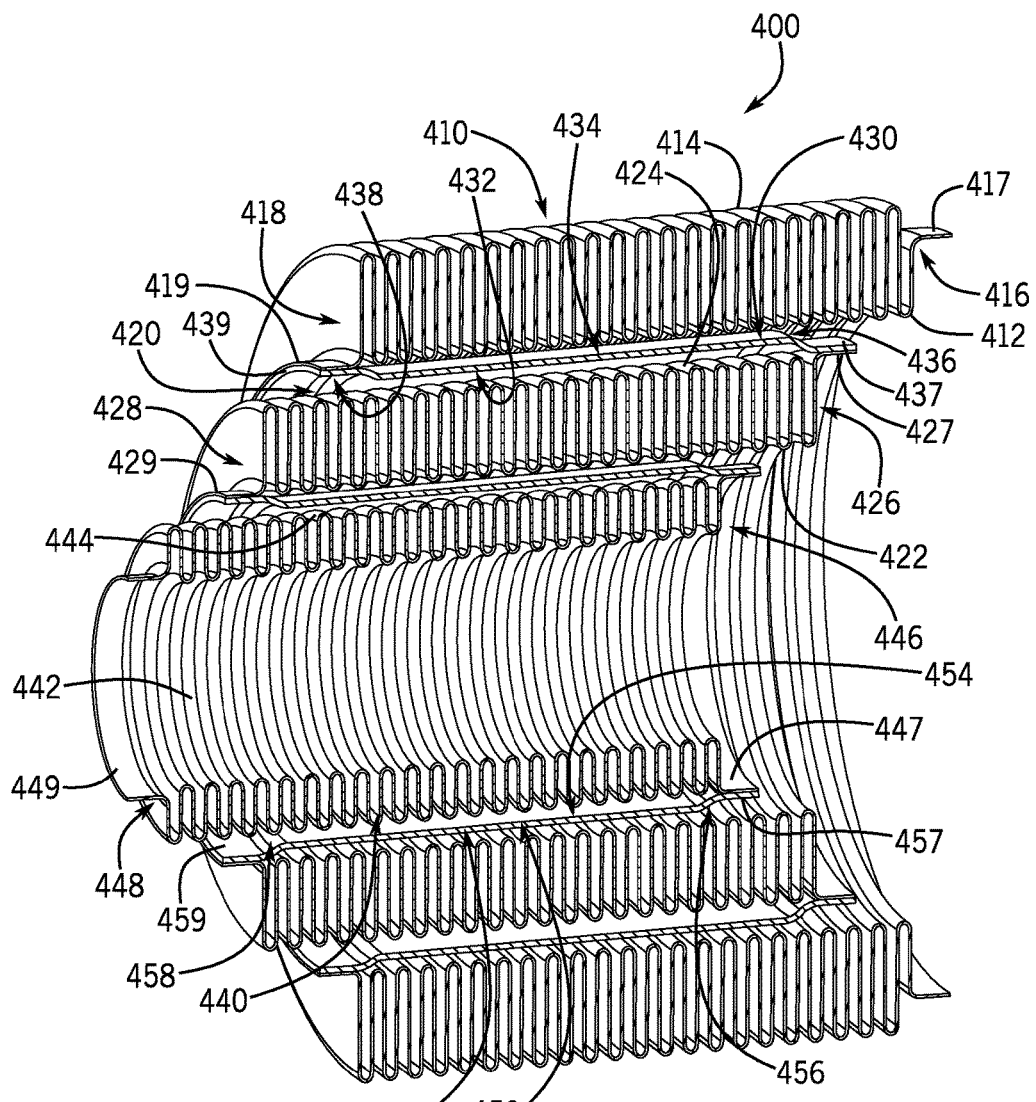
FIG. 9 of the drawings shows a perspective cross sectional view of another embodiment of the inventive flexible metal seal assembly, in which the invention comprises at least three flexible metal seals.

In the embodiment shown in FIG. 9, the diameter of first flexible metal seal 410 is larger than the diameter of second flexible metal seal 420, and that latter diameter is larger than the diameter of third flexible metal seal 440. This allows third flexible metal seal 440 to be telescopically received within second flexible metal seal 420, which itself may be telescopically received within first flexible metal seal 410. Embodiment 400 may be used if the design calls for high pressure applications requiring long life, as the use of additional bellows seals enables a designer to distribute the forces and stresses borne by the flexible metal seal assembly across three bellows seals instead of only two. This embodiment likewise enables the creation of a "tuned" assembly that maximizes the assembly's life span, in view of such variables as stroke pressure, frequency of stroke and length of stroke.

Figure 10:
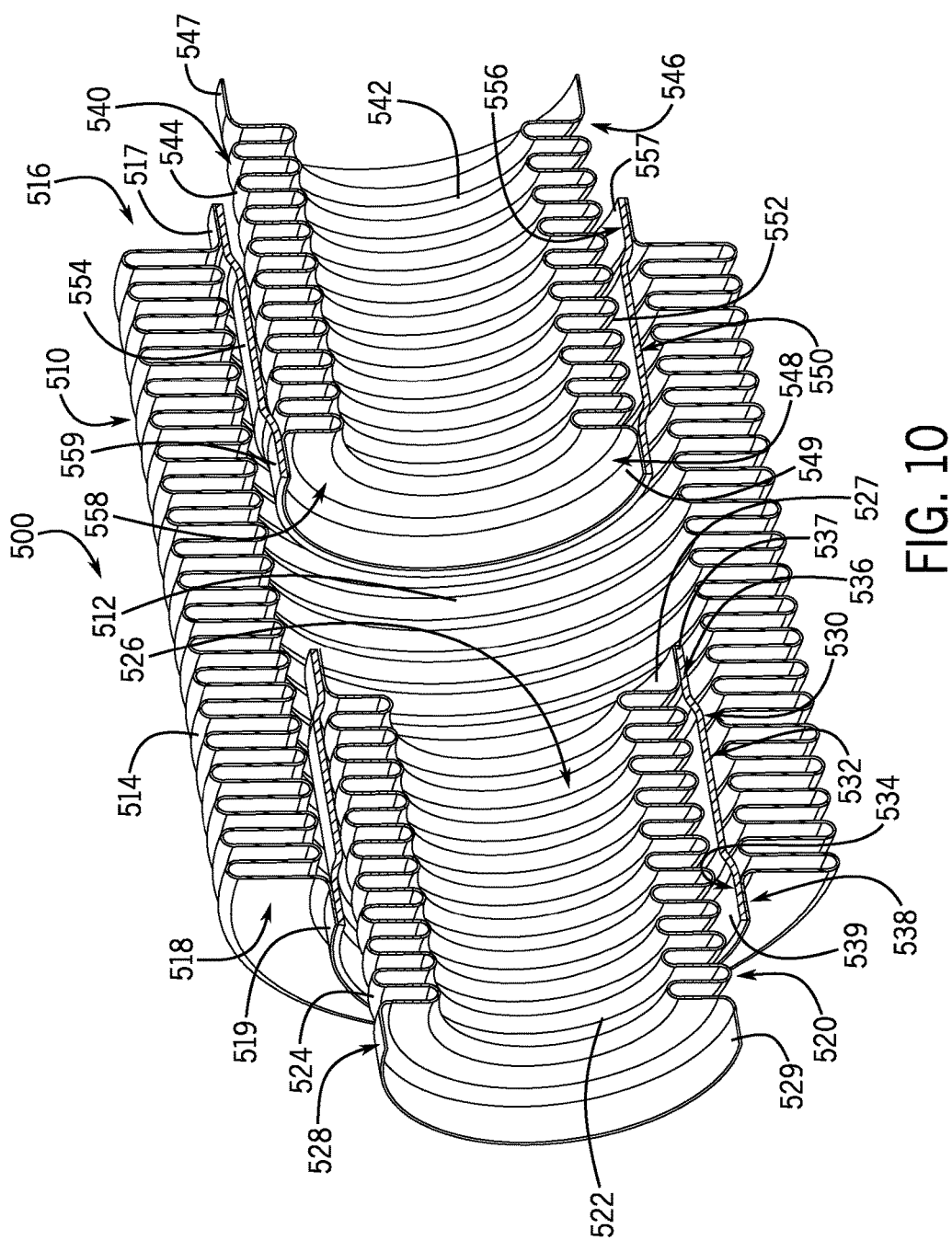
FIG. 10 of the drawings shows a perspective cross sectional view of another embodiment of the flexible metal seal assembly, in which the invention comprises at least three flexible metal seals, where two flexible metal seals have substantially the same diameter, in which each is partially embedded within a flexible metal seal having a larger diameter.

In another preferred embodiment, as shown in FIG. 10, flexible metal seal assembly 500 includes first flexible metal seal 510, second flexible metal seal 520 and third flexible metal seal 540. Assembly 500 further comprises first metallic coupler 530 and second metallic coupler 550. In this embodiment, the sealing arrangement concept defined by using first and second flexible metal seals 510 and 520, which are sealed together using metallic coupler 530 towards the bottom end 518 of first flexible metal seal 510, is repeated on the other, top end 516 of first flexible metal seal 510, relative to first and third flexible metal seals 510 and 540—using second metallic coupler 550.

Specifically, as shown in FIG. 10, third flexible metal seal 540 includes outer surface 544, which is restrainably and hermetically attached to inner surface 552 of second metallic coupler 550. Likewise, outer surface 554 of second metallic coupler 550 is restrainably and hermetically attached to inner surface 512 of first flexible metal seal 510. Also, second flexible metal seal 520, through its outer surface 524, is restrainably and hermetically attached to inner surface 532 of first metal coupler 530. Likewise, outer surface 534 of coupler 530 is restrainably and hermetically sealed to inner surface 512 of first flexible metal seal 510. Each of first, second and third flexible metal seals 510, 520 and 540 are concentric about a common longitudinal axis, are arranged in series and cooperate with each other so as to alternatively extend and compress simultaneously.

As in the embodiment shown in FIG. 9, each of first, second and third flexible metal seals 510, 520 and 540 have their own spring constant $k_1$, $k_2$ and $k_3$, respectively, with at least two of the spring constants being different from each other. Thus, flexible metal seal assembly 500 serves to bias the movement of a reciprocating actuator positioned along the common longitudinal axis. As one of skill in the art would appreciate, the equivalent spring constant $k_{eq}$ of the combined flexible metal seal assembly 500 is likewise described by the following equation:

$$\frac{1}{keq} = \frac{1}{k1} + \frac{1}{k2} + \frac{1}{k3}$$

In the embodiment shown in FIG. 10, the diameter of first flexible metal seal 510 is larger than the diameters of second and third flexible metal seals 520, 540. Further, the diameters of second and third flexible metal seals 520, 540 may or may not be substantially equal, depending on the shape and taper of the respective metal coupler. This arrangement of diameters allows each of second and third flexible metal seals 520, 540 to be telescopically received within first flexible metal seal 510, albeit on opposite ends—top end 516 and bottom end 518, respectively—of first flexible metal seal 510. As with seal assembly 400 shown in FIG. 9, seal assembly 500 in FIG. 10 may be used if the design calls for high pressure applications requiring long life, as the use of additional bellows seals enables a designer to distribute the forces and stresses borne by the flexible metal seal assembly across three bellows seals instead of only two.

Notably, while the embodiment shown in FIG. 10 includes one large flexible metal seal—flexible metal seal 510—and two smaller flexible metal seals—flexible metal seals 520, 540, the invention contemplates that this arrangement can be inverted, in which two of the flexible metal seals are larger, with one flexible metal seal having a smaller diameter being positioned therebetween. The metallic coupler elements 530, 550 in such an embodiment would serve the same purpose of providing restrainable, hermetical sealing attachments between each pair of flexible metal seals. That is, metallic coupler element 530 may be used to join larger flexible metal seal 520 to smaller flexible metal seal 510, at bottom end 518 of flexible metal seal 510, and metallic coupler element 550 may be used to join larger flexible metal seal 540 to smaller flexible metal seal 510, at top end 516 of flexible metal seal 510.

As noted above, the flexible metal seal assemblies of the present invention may be used in more than one machine environment or application. In one example application, the inventive flexible metal seal assemblies may be used in the operative region of a high pressure fuel pump for a diesel engine. In that application, the seal assemblies may take the place of one or more standard spring elements, while serving to isolate one or two fluids, to prevent commingling or contamination of those fluids.

Figure 11A:
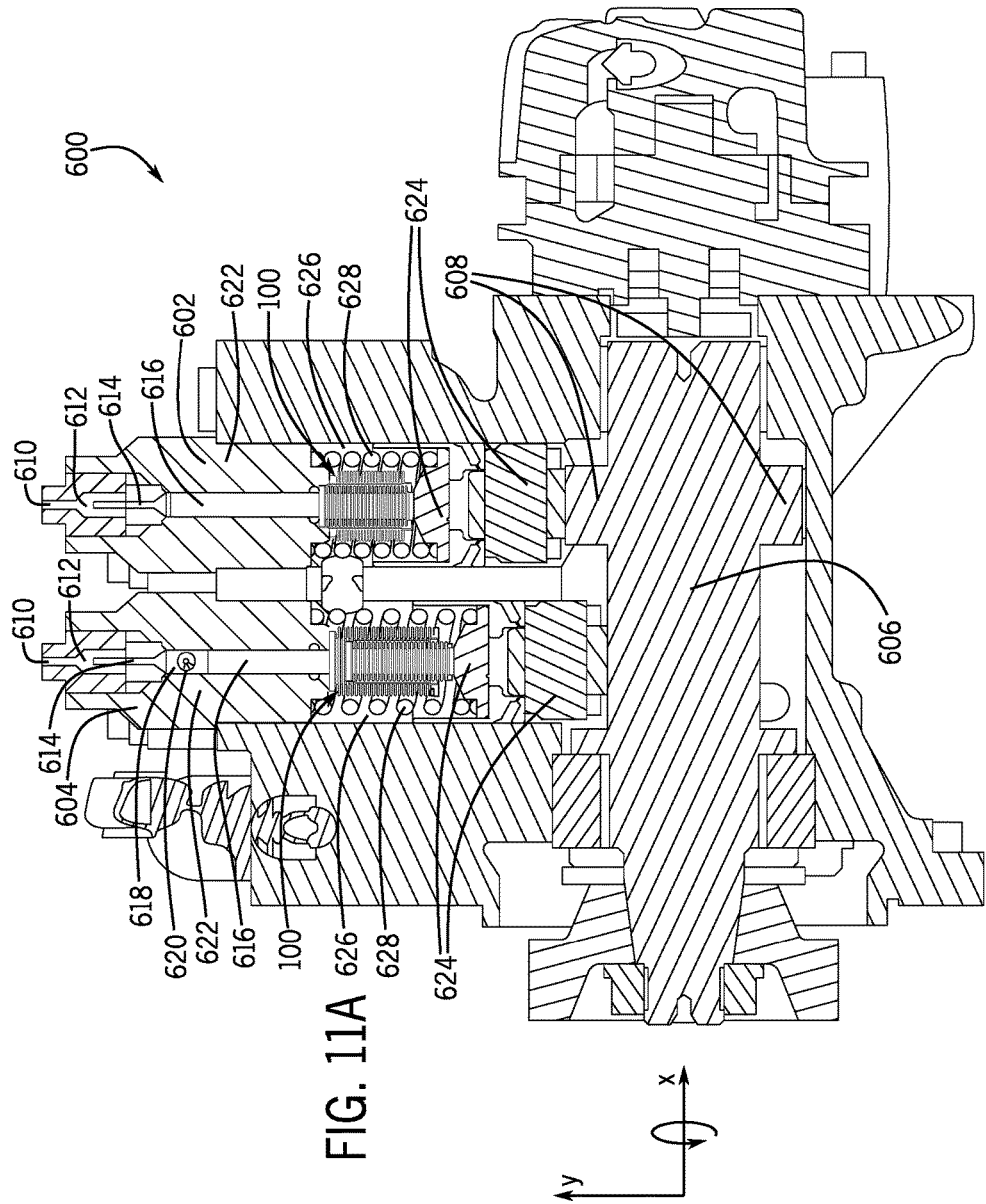
FIG. 11A of the drawings is an elevated cross-sectional view of a fuel pump machine for a diesel engine incorporating the inventive flexible metal seal assembly of the present invention surrounding each of two pistons of a dual piston diesel fuel pump.

FIGS. 11A and 11B show inventive flexible metal seal assembly 100 in use in a diesel engine's high pressure fuel pump 600. Specifically, FIG. 11A shows the complete environment, depicting all of the relevant machine elements, whereas FIG. 11B is enlarged to highlight the operation of flexible metal seal assembly 100. FIG. 11A stands in contrast to FIG. 1, which shows a conventional version of a high pressure fuel pump, including outer spring 28 and inner spring 30 disposed within spring bias region 26. In FIGS. 11A and 11B, inventive flexible metal seal assembly is utilized to separate lubricating oil from diesel fuel and vice versa.

FIG. 11A shows fuel pump 600 having a twin piston construction with two piston sides, namely, right side 602 and left side 604. Specifically, the piston shown in right side 602 is oriented at its apex, with its respective flexible metal seal assembly 100 being fully compressed, while left side 604 shows assembly 100 is in its fully expanded. As is true for the fuel pump shown in FIG. 1, outer spring 628 and flexible metal seal assembly 100 surround piston 616, and serve to exert a spring bias downward against cam followers 624. Cam shaft 606 typically rotates along the x-axis, between 60 and 100 revolutions per minute. In the environment of a dual-piston fuel pump having two cam lobes cooperating with on each piston, the inventive flexible metal seal assemblies will collectively expand and compress between 240 and 400 times per minute.

In FIG. 11A, cam shaft 606 operates both right and left sides 602, 604 of fuel pump 600, using cams 608. The corresponding cams in the left side of cam shaft 602, which operates left side 604 of fuel pump 600, cannot be seen in this view. When cams 608 align vertically, they exert forces upwardly against cam followers 624, thereby compressing outer spring 628 and inventive flexible metal seal assembly 100. As a result of that upward compression, piston 616 likewise moves upward, where it forces fuel into its respective fuel outlets 620, and, in turn, into the fuel rail (not shown).

As cam shaft 606 rotates and cam lobes 608 retract from their vertical position, cam followers 624 and pistons 616 are pushed downwardly by the spring bias exerted by outer spring 628 and flexible metal seal assembly 100, to draw fuel from fuel collection regions 612 into fuel pumping regions 618. As piston 616 moves downward, the volume of fuel within pumping region 618 increases, as pistons 616 draw fuel from fuel inlets 610, through check valves 614 and into fuel pumping region 618, where high pressure fuel outlets 620 are located.

As in the conventional fuel pump shown in FIG. 1, as shown in FIGS. 11A and 11B, fuel may coat the outer surface of pistons 616, as pistons 616 reciprocate up and down, to alternatively extract fuel from fuel inlets 610 into fuel pumping region 618, and propel that fuel outwardly through high pressure fuel outlets 620. Likewise, a lubricant such as oil is present in spring bias regions 626, to lubricate the movement of outer spring 628 and cam followers 624, among other elements. As in FIG. 1, the fuel that coats the outer surface of pistons 616 may travel downwardly and into spring bias regions 626. However, flexible metal seal assembly 100 prevents the fuel coating pistons 616 from mingling with the oil present in spring bias regions 626, while simultaneously spring biasing elements for the piston's operation.

As can be seen in detail in FIG. 11B, flexible metal seal assembly 100 includes first and second flexible metal seals 110, 120. Top end 116 of first flexible metal seal 110 bears against—and is restrainably, and hermetically, attached to— piston guides 622. Likewise, bottom end 128 of second flexible metal seal 120 is restrainably and hermetically attached either directly to piston 616, or to sealing element 636, which would itself be restrainably and hermetically attached directly to piston 616. In turn, the bottom-facing surface of piston 616, and the bottom surface of sealing element 636 (if such a sealing element is used) bear against a bearing surface on top end 634 of cam follower 624. This structural orientation and hermetic sealing arrangement serves to prevent the fuel that is coating pistons 616 from commingling with the oil present in spring bias regions 626.

Specifically, any fuel that coats pistons 616 may also bear upon the inner surface 122 of second flexible metal seal 120. At the bottom end 126 of second flexible metal seal 120, however, such fuel is blocked by sealing element 636. Likewise, since metallic coupler 130 is restrainably and hermetically sealed to outer surface 124 of second flexible metal seal 120, at top end 127 of second flexible metal seal 120, the fuel coating piston 616 cannot escape from the inside of first flexible metal seal 110.

Moreover, any lubricant or oil that is present in spring bias regions 626 may bear upon the outer surface 114 of first flexible metal seal 110. Depending on the design characteristics of sealing element 636, such oil may even travel upwardly into flexible metal seal assembly 100, and bear upon the outer surface 124 of second flexible metal seal 120. However, at the top end 128 of second flexible metal seal 120, metallic coupler 130 is restrainably and hermetically sealed to outer surface 124 of second flexible metal seal 120. Thus, any oil traveling up outer surface 124 of second flexible metal seal 120 is blocked from entering within the interior of second flexible metal seal 120 by the hermetic seal between second flexible metal seal 120 and metallic coupler 130. In this way, the two fluids, lubricating oil and fuel, are isolated from each other, and maintained in separate regions of the fuel pump, never to commingle.

In one preferred embodiment, flexible metal seal assembly 100 can be used in a fuel pump for a diesel engine. In that preferred embodiment, the ratio between first spring constant $k_1$ and second spring constant $k_2$, expressed as $k_1/k_2$, is between 1:1.2 and 1:3. In another preferred embodiment of flexible metal seal assembly 100, as used in a fuel pump for a diesel engine, the ratio of axial deflection of first flexible metal seal assembly 110 to second flexible metal seal assembly 120 is between 3:1 and 6:5.

Figure 12:
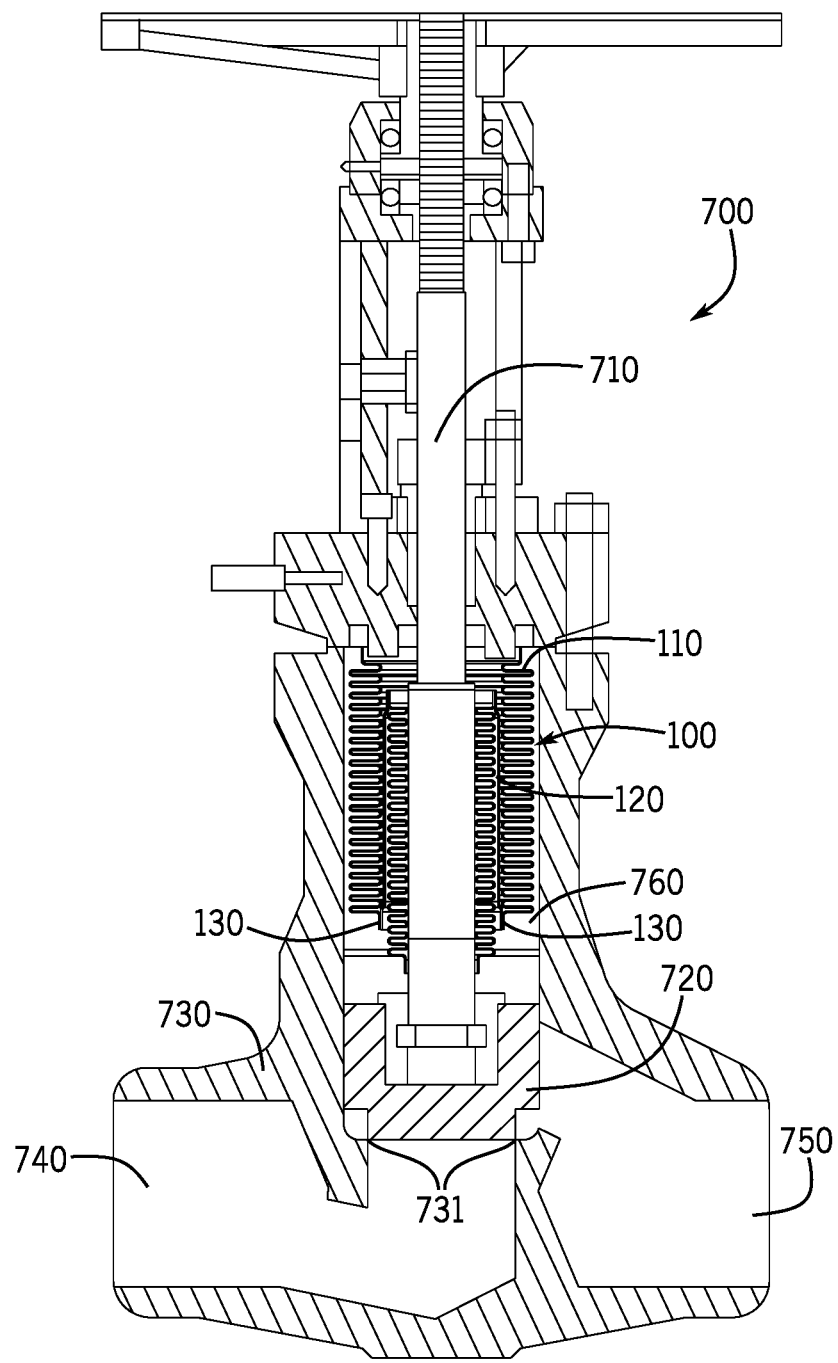
FIG. 12 of the drawings shows an elevated cutaway view of an alternative application of the present flexible metal seal assembly, in which the invention surrounds a reciprocating actuator within a valve seal, to seal the region positioned immediately about the piston, and simultaneously exert, during operation, a spring bias against the valve seal.

Another environment or application in which the flexible metal seal assemblies of the present invention may be used, amongst yet others, is in a valve seal, as shown in FIG. 12. In that environment, flexible metal seal assembly surrounds reciprocating actuator 710 and may exert a spring bias force downward against seal 720, to assist in maintaining seal 720 in its closed position (shown in FIG. 12). Valve seal 700 has a fluid enclosure region 730 having an interior volume 740. Fluid may travel through interior volume 740 until it encounters seal 731. If seal 731 is open (that is, if seal 731 is moved upwardly from the position shown in FIG. 12), then fluid may flow freely from interior volume 740 through to fluid passage 750. As an additional benefit, flexible metal seal assembly 100 may be used to prevent the commingling of certain fluids, or to prevent one fluid from migrating to another region. For example, if lubricating oil is present on the outer surface of reciprocating actuator 710, that oil would be incapable of exiting the interior volume created by the outer surface of reciprocating actuator 710 and the inner surface of second flexible metal seal 120. Likewise, any sealing or other fluid present in region 760 of valve seal 700 cannot enter that interior volume within second flexible metal seal 120, due to the hermetic seal between second flexible metal seal 120 and metallic coupler 130. Since the region immediately surrounding piston 710 is in communication with the environment, seal assembly 100 may be proximate a gas or other fluid, and seal assembly 100 further isolates that gas or fluid from the outside of flexible metal seal 110, from inadvertent, detrimental migration.

The embodiments disclosed herein are exemplary in nature and are not intended to restrict the scope of the invention. Alternate materials, methods of securing the various parts on the invention, and different configurations for the flexible metal seals, metallic couplers and seal assemblies are contemplated as being within the scope of the invention.

The foregoing description and drawings merely explain and illustrate the invention, and the invention is not limited thereto, except as those skilled in the art who have the present disclosure before them will be able to make modifications and variations therein without departing from the scope of the invention.

What is claimed is:

1. A flexible metal seal assembly configured for use in hermetically isolating at least one fluid within an operative region of a machine, said flexible metal seal assembly comprising:
    a first flexible metal seal configured to be positioned within said operative region, said first flexible metal seal having an inner surface, an outer surface, a top end and a bottom end opposite said top end, a first diameter and a first spring constant; and
    at least a second flexible metal seal configured to be positioned within said operative region, said second flexible metal seal having an inner surface, an outer surface, a top end and a bottom end opposite said top end, a second diameter and a second spring constant;
    at least a first substantially rigid metallic coupler having a substantially cylindrical shape, said metallic coupler having an inner surface, an outer surface, a top end and a bottom end opposite said top end,
    at least a first portion of said metallic coupler being restrainably and hermetically attached to the inner surface of said first flexible metal seal, and at least a second portion of said metallic coupler being restrainably and hermetically attached to the outer surface of said second flexible metal seal, said first portion of said metallic coupler being closer to the bottom end of said metallic coupler than said second portion of said metallic coupler,
    said outer surface of said first flexible metal seal being configured to create an outer containment region for containing a first volume of fluid within said operative region of said machine, said inner surface of said second flexible metal seal being configured to create an inner containment region for containing a second volume of fluid, said first and second flexible metal seals being concentric about a common longitudinal axis, and cooperating with one another to alternatively extend and compress simultaneously, in series, each of said first and second flexible metal seals being configured to serve as a biasing member, at least during operation, relative to the movement of a reciprocating actuator located within said operative region, said actuator being positioned substantially along said common longitudinal axis, the compression of said first flexible metal seal occurring during the compression of said second flexible metal seal, and the extension of said first flexible metal seal occurring during the extension of said second flexible metal seal, said first volume of fluid contained in said outer containment region being hermetically isolated from, and not in fluid communication with, said second volume of fluid contained in said inner containment region, said first and second flexible metal seals jointly describing a dual seal configured to preclude the migration of a first fluid located within said operative region.

2. The flexible metal seal assembly according to claim 1, in which said first diameter of said first flexible metal seal is larger than said second diameter of said second flexible metal seal.

3. The flexible metal seal assembly according to claim 2, in which said second flexible metal seal is configured to be fully telescopically received within said first flexible metal seal.

4. The flexible metal seal assembly according to claim 2, in which said second flexible metal seal is configured to be partially telescopically received within said first flexible metal seal.

5. The flexible metal seal assembly according to claim 2, in which said second portion of said metallic coupler is restrainably and hermetically attached to the top end of said second flexible metal seal and said first portion of said metallic coupler is restrainably and hermetically attached to the bottom end of said first flexible metal seal, said top end of said second flexible metal seal being incapable of deflecting axially beyond said bottom end of said first flexible metal seal, rendering the second flexible metal seal incapable of being telescopically received within said first flexible metal seal.

6. The flexible metal seal assembly according to claim 1, in which said first and second flexible metal seals each comprise fluid impervious bellows elements.

7. The flexible metal seal assembly according to claim 1, in which said first fluid is a machine lubricant.

8. The flexible metal seal assembly according to claim 7, in which said machine lubricant is oil.

9. The flexible metal seal assembly according to claim 1, in which said at least one fluid further comprises a second fluid, located within said operative region, isolated from contact with said first fluid by said flexible metal seal assembly.

10. The flexible metal seal assembly according to claim 9, in which said second fluid is diesel fuel.

11. The flexible metal seal assembly according to claim 1, in which said first spring constant and said second spring constant combine in series to form an equivalent spring constant that exerts a spring bias force.

12. The flexible metal seal assembly according to claim 11, in which the reciprocating actuator is a piston driven by a cam follower, and the spring bias force is configured to be exerted against the piston in a fuel pump for a diesel engine.

13. The flexible metal seal assembly according to claim 11, in which the spring bias force is configured to be exerted against a valve seal.

14. The flexible metal seal assembly according to claim 1, in which said second portion of said metallic coupler is restrainably and hermetically attached to the top end of said second flexible metal seal.

15. The flexible metal seal assembly according to claim 1, in which said first portion of said metallic coupler is restrainably and hermetically attached to the bottom end of said first flexible metal seal.

16. The flexible metal seal assembly according to claim 1, in which said first flexible metal seal, said metallic coupler and said second flexible metal seal are made from one of the following alloys: stainless steel, Inconel, nickel, copper and bronze.

17. The flexible metal seal assembly according to claim 1, in which the ratio between said first spring constant and said second spring constant ranges from about 1.2:1 to about 3:1.

18. The flexible metal seal assembly according to claim 1, in which the ratio of axial deflection of said first flexible metal seal and said second flexible metal seal ranges from about 33% to about 83%.

19. The flexible metal seal assembly according to claim 1, in which said metallic coupler is restrainably and hermetically attached to each of said first and second flexible metal seals by welding.

20. The flexible metal seal assembly according to claim 1, in which said metallic coupler is restrainably and hermetically attached to each of said first and second flexible metal seals by brazing.

21. The flexible metal seal assembly according to claim 1, in which the invention further comprises:

a third flexible metal seal configured to be positioned within said operative region, said third flexible metal seal having an inner surface, an outer surface, a top end and a bottom end opposite said top end, a third diameter and a third spring constant; and a second substantially rigid metallic coupler having a substantially cylindrical shape, said second metallic coupler having an inner surface, an outer surface, a top end and a bottom end opposite said top end, said first, second and third flexible metal seals being positioned concentrically about a common longitudinal axis, and cooperating with each other to alternatively extend and compress simultaneously, in series, at least one of said first, second and third spring constants being different from another of said first, second and third spring constants, each of said first, second and third flexible metal seals being configured to serve as a biasing member relative to the movement of a reciprocating actuator located within said operative region, positioned substantially along said common longitudinal axis, the compression of said first, second and third flexible metal seals occurring simultaneously, and the expansion of said first, second and third flexible metal seals occurring simultaneously, said first, second and third flexible metal seals jointly describing a triple seal configured to preclude the migration of a first fluid within said operative region.

22. The flexible metal seal assembly according to claim 21, in which said first diameter of said first flexible metal seal is larger than said second diameter of said second flexible metal seal, and said second diameter of said second flexible metal seal is larger than said third diameter of said third flexible metal seal, at least a first portion of said second metallic coupler being restrainably and hermetically attached to the inner surface of said second flexible metal seal, and at least a second portion of said second metallic coupler being restrainably and hermetically attached to the outer surface of said third flexible metal seal, said first portion of said second metallic coupler being positioned closer to the bottom end of said second metallic coupler than said second portion of said second metallic coupler.

23. The flexible metal seal assembly according to claim 21, in which said first diameter of said first flexible metal seal is larger than said second diameter of said second flexible metal seal, and said second diameter of said second flexible metal seal is substantially equal to said third diameter of said third flexible metal seal, at least a first portion of said first metallic coupler being restrainably and hermetically attached to the inner surface of said first flexible metal seal, and at least a second portion of said second metallic coupler also being restrainably and hermetically attached to the inner surface of said first flexible metal seal at a position substantially opposite said first portion said first metallic coupler being attached restrainably and hermetically to the outside top end of said second flexible metal seal, and said second metallic coupler being restrainably and hermetically attached to the outside bottom end of said third flexible metal seal.

24. The flexible metal seal assembly according to claim 1, in which said first diameter and said second diameter are substantially equal in dimension.

25. The flexible metal seal assembly according to claim 1, in which said first spring constant is different from said second spring constant.

26. The flexible metal seal assembly according to claim 1, in which said first spring constant is the same as said second spring constant.

27. The flexible metal seal assembly according to claim 1, in which the fluid in said first volume of fluid is different than the fluid in said second volume of fluid.

28. A flexible metal seal assembly configured for use in hermetically isolating at least one fluid within an operative region of a machine, said flexible metal seal assembly comprising:

a first flexible metal seal configured to be positioned within said operative region, said first flexible metal seal having an inner surface, an outer surface, a top end and a bottom end opposite said top end, a first diameter and a first spring constant; and a second flexible metal seal configured to be positioned within said operative region, said second flexible metal seal having an inner surface, an outer surface, a top end and a bottom end opposite said top end, a second diameter and a second spring constant;

a first substantially rigid metallic coupler having a substantially cylindrical shape, said metallic coupler having an inner surface, an outer surface, a top end and a bottom end opposite said top end, at least a first portion of said metallic coupler being restrainably and hermetically attached to the inner surface of said first flexible metal seal, and at least a second portion of said metallic coupler being restrainably and hermetically attached to the outer surface of said second flexible metal seal, said first portion of said metallic coupler being closer to the bottom end of said metallic coupler than said second portion of said metallic coupler, said outer surface of said first flexible metal seal being configured to create an outer containment region for containing a first volume of fluid within said operative region of said machine, said inner surface of said second flexible metal seal being configured to create an inner containment region for containing a second volume of fluid, said first and second flexible metal seals being concentric about a common longitudinal axis, and cooperating with one another to alternatively extend and compress simultaneously, in series, each of said first and second flexible metal seals being configured to serve as a biasing member at least during the movement of a reciprocating actuator located within said operative region, positioned substantially along said common longitudinal axis, the compression of said first flexible metal seal and the compression of said second flexible metal seal occurring simultaneously, and the expansion of said first flexible metal seal and said second flexible metal seal occurring simultaneously, said first and second flexible metal seals jointly describing a dual seal configured to preclude the migration between said first volume of fluid isolated within said outer containment region and said second volume of fluid isolated within said inner containment region, said first and second flexible metal seals each comprising fluid impervious bellows elements, wherein said first volume of fluid is a lubricant, and said second volume of fluid is a fuel.

29. The flexible metal seal assembly according to claim 28, in which said second flexible metal seal is configured to be at least partially telescopically received within said first flexible metal seal.

30. The flexible metal seal assembly according to claim 28, in which said first spring constant is different from said second spring constant.

31. The flexible metal seal assembly according to claim 28, in which said first spring constant is the same as said second spring constant.

32. The flexible metal seal assembly according to claim 28, in which the fluid in said first volume of fluid is different than the fluid in said second volume of fluid.

33. A flexible metal seal assembly configured for use in hermetically isolating at least one fluid within an operative region of a machine, said flexible metal seal assembly comprising:

a first flexible metal seal configured to be positioned within said operative region, said first flexible metal seal having an inner surface, an outer surface, a top end and a bottom end opposite said top end, a first diameter and a first spring constant; and a second flexible metal seal configured to be positioned within said operative region, said second flexible metal seal having an inner surface, an outer surface, a top end and a bottom end opposite said top end, a second diameter and a second spring constant;

a first substantially rigid metallic coupler having a substantially cylindrical shape, said metallic coupler having an inner surface, an outer surface, a top end and a bottom end opposite said top end, at least a first portion of said metallic coupler being restrainably and hermetically attached to the inner surface of said first flexible metal seal, and at least a second portion of said metallic coupler being restrainably and hermetically attached to the outer surface of said second flexible metal seal, said first portion of said metallic coupler being closer to the bottom end of said metallic coupler than said second portion of said metallic coupler, said outer surface of said first flexible metal seal being configured to create an outer containment region for containing a first volume of fluid within said operative region of said machine, said inner surface of said second flexible metal seal being configured to create an inner containment region for containing a second volume of fluid, said first and second flexible metal seals being concentric about a common longitudinal axis, and cooperating with one another to alternatively extend and compress simultaneously, in series, each of said first and second flexible metal seals being configured to serve as a biasing member, at least during the movement of a reciprocating actuator located within said operative region, positioned substantially along said common longitudinal axis, the compression of said first flexible metal seal and the compression of said second flexible metal seal occurring simultaneously, and the expansion of said first flexible metal seal and said second flexible metal seal occurring simultaneously, said first and second flexible metal seals jointly describing a dual seal configured to preclude the migration between said first volume of fluid isolated within said outer containment region and said second volume of fluid isolated within said inner containment region, said first and second flexible metal seals each comprising fluid impervious bellows elements, said first and second flexible metal seals jointly describing a dual seal assembly, wherein said first spring constant and said second spring constant combine to form an equivalent spring constant that is configured to exert a spring bias force against a valve seal.

34. The flexible metal seal assembly according to claim 33, in which said first spring constant is different from said second spring constant.

35. The flexible metal seal assembly according to claim 33, in which said first spring constant is the same as said second spring constant.

36. The flexible metal seal assembly according to claim 33, in which the fluid in said first volume of fluid is different than the fluid in said second volume of fluid.

* * * * *